United States Patent
Makino et al.

(10) Patent No.: US 10,603,658 B1
(45) Date of Patent: Mar. 31, 2020

(54) HONEYCOMB STRUCTURED BODY

(71) Applicants: IBIDEN CO., LTD., Ogaki-shi (JP); TOYOTA JIDOSHA KABUSHIKI KAISHA, Toyota-shi (JP)

(72) Inventors: Misako Makino, Ibi-gun (JP); Daisuke Mori, Ibi-gun (JP); Takeru Yoshida, Toyota (JP); Hiromasa Suzuki, Toyota (JP); Masaru Kakinohana, Toyota (JP); Takumi Tojo, Toyota (JP)

(73) Assignees: IBIDEN CO., LTD., Ogaki-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/566,888

(22) Filed: Sep. 11, 2019

(30) Foreign Application Priority Data

Sep. 12, 2018 (JP) .................................. 2018-170618

(51) Int. Cl.
| | |
|---|---|
| *B01J 21/04* | (2006.01) |
| *B01J 23/10* | (2006.01) |
| *B01J 23/38* | (2006.01) |
| *B01J 35/04* | (2006.01) |
| *B01D 53/94* | (2006.01) |

(52) U.S. Cl.
CPC .............. *B01J 35/04* (2013.01); *B01D 53/94* (2013.01); *B01J 21/04* (2013.01); *B01J 23/10* (2013.01); *B01J 23/38* (2013.01); *B01D 2255/10* (2013.01)

(58) Field of Classification Search
CPC ... B01J 21/04; B01J 23/10; B01J 23/38; B01J 35/04
See application file for complete search history.

(56) References Cited

U.S. PATENT DOCUMENTS

| | | | | |
|---|---|---|---|---|
| 5,139,992 A | * | 8/1992 | Tauster | B01D 53/945 423/213.5 |
| 5,266,548 A | * | 11/1993 | Koradia | B01D 53/945 502/439 |
| 5,491,120 A | * | 2/1996 | Voss | B01J 37/0244 502/304 |
| 5,935,897 A | * | 8/1999 | Trubenbach | C07C 37/07 502/150 |
| 5,935,898 A | * | 8/1999 | Trubenbach | B01J 35/10 502/150 |

(Continued)

FOREIGN PATENT DOCUMENTS

WO    WO 2018/012565    1/2018

*Primary Examiner* — Cam N. Nguyen
(74) *Attorney, Agent, or Firm* — Mori & Ward, LLP

(57) ABSTRACT

The present invention provides a honeycomb structured body capable of achieving more effective use of a catalyst in partition walls and having excellent exhaust gas conversion performance. The present invention relates to a honeycomb structured body including: a honeycomb fired body in which multiple through-holes are arranged longitudinally in parallel with one another with a partition wall therebetween, wherein the honeycomb fired body contains ceria-zirconia composite oxide particles and alumina particles, the partition wall of the honeycomb fired body contains macropores having a pore size of 2 to 50 μm, and in an electron microscope image of a cross section of the partition wall, the percentage of the area occupied by pores having a pore size of 5 to 15 μm is at least 85% of the total area of the macropores.

7 Claims, 2 Drawing Sheets

(56) References Cited

U.S. PATENT DOCUMENTS

| | | | | |
|---|---|---|---|---|
| 7,041,622 | B2* | 5/2006 | Nunan | B01J 23/63 502/327 |
| 7,214,643 | B2* | 5/2007 | Yamamoto | C01G 25/00 423/592.1 |
| 7,250,385 | B1* | 7/2007 | Ohno | B01D 53/945 502/178 |
| 7,517,830 | B2* | 4/2009 | Nomura | F01N 3/035 502/302 |
| 7,524,350 | B2* | 4/2009 | Kunieda | B01D 39/2075 428/312.8 |
| 7,722,829 | B2* | 5/2010 | Punke | B01J 23/42 422/180 |
| 7,731,774 | B2* | 6/2010 | Ohno | B01D 46/2429 502/439 |
| 7,875,250 | B2* | 1/2011 | Nunan | B01D 53/945 422/168 |
| 7,947,238 | B2* | 5/2011 | Deeba | B01D 53/944 423/213.2 |
| 8,283,282 | B2* | 10/2012 | Noguchi | B01D 46/2429 502/439 |
| 8,409,519 | B2* | 4/2013 | Watanabe | B01D 53/945 422/180 |
| 8,455,391 | B2* | 6/2013 | Hanaki | B01D 53/944 502/304 |
| 8,956,994 | B2* | 2/2015 | Ifrah | B01D 53/9413 502/100 |
| 9,057,310 | B2* | 6/2015 | Bergeal | B01J 23/44 |
| 9,327,239 | B2* | 5/2016 | Morgan | B01D 53/9454 |
| 9,347,349 | B2* | 5/2016 | Blakeman | F01N 13/009 |
| 9,366,166 | B2* | 6/2016 | Blakeman | B01D 53/9445 |
| 9,387,461 | B2* | 7/2016 | Wu | B01D 53/945 |
| 9,527,034 | B2* | 12/2016 | Bergeal | B01J 37/0205 |
| 9,527,035 | B2* | 12/2016 | Bergeal | B01J 21/12 |
| 10,060,312 | B2* | 8/2018 | Suzawa | F01N 3/0821 |
| 10,232,348 | B2* | 3/2019 | Wu | B01J 23/10 |
| 10,286,392 | B2* | 5/2019 | Kobayashi | F01N 3/035 |
| 10,384,954 | B2* | 8/2019 | Ifrah | C01F 17/32 |
| 10,472,290 | B2* | 11/2019 | Goto | B01J 23/10 |
| 2001/0026838 | A1* | 10/2001 | Dettling | B01J 23/63 427/230 |
| 2003/0061860 | A1* | 4/2003 | Hu | B01D 53/9454 73/23.31 |
| 2006/0292393 | A1* | 12/2006 | Kunieda | B01J 35/04 428/688 |
| 2007/0204580 | A1* | 9/2007 | Kunieda | B01D 39/2075 55/523 |
| 2008/0317999 | A1* | 12/2008 | Patchett | B01D 53/9418 428/116 |
| 2009/0041645 | A1* | 2/2009 | Wassermann | B01J 21/066 423/213.5 |
| 2009/0238733 | A1* | 9/2009 | Ohno | B01D 46/2429 422/180 |
| 2009/0291839 | A1* | 11/2009 | Kunieda | B01D 46/2429 502/74 |
| 2009/0298673 | A1* | 12/2009 | Akamine | B01J 21/066 502/65 |
| 2010/0166629 | A1* | 7/2010 | Deeba | B01D 53/944 423/213.5 |
| 2011/0107752 | A1* | 5/2011 | Galligan | B01D 53/945 60/299 |
| 2013/0336864 | A1* | 12/2013 | Zheng | B01J 23/63 423/213.5 |
| 2014/0140911 | A1* | 5/2014 | Bergeal | B01J 35/0006 423/213.5 |
| 2014/0235189 | A1* | 8/2014 | Uehara | G01S 19/23 455/260 |
| 2014/0369912 | A1* | 12/2014 | Zheng | B01J 23/63 423/213.5 |
| 2017/0314448 | A1* | 11/2017 | Brown | B01J 23/60 |
| 2018/0361299 | A1* | 12/2018 | Ingram-Ogunwumi | B01D 46/2425 |
| 2018/0363523 | A1* | 12/2018 | Ingram-Ogunwumi | B01D 46/2425 |
| 2019/0144342 | A1 | 5/2019 | Goto et al. | |

* cited by examiner

HONEYCOMB STRUCTURED BODY

TECHNICAL FIELD

The present invention relates to a honeycomb structured body.

BACKGROUND ART

Exhaust gas discharged from internal combustion engines of automobiles and the like contains particulate matter (PM) and harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating a honeycomb-shaped monolithic substrate made of cordierite or the like with slurry containing noble metal particles having catalytic activity.

Patent Literature 1 discloses a honeycomb structured body including a honeycomb fired body which is an extrudate containing ceria-zirconia composite oxide particles (hereinafter also referred to as "CZ particles) and alumina particles, wherein peaks in a pore size distribution curve are in ranges of 0.01 to 0.1 μm and 0.1 to 5 μm.

CITATION LIST

Patent Literature

Patent Literature 1: WO 2018/012565

SUMMARY OF INVENTION

Technical Problem

In the honeycomb structured body disclosed in Patent Literature 1, the pore size is small so that exhaust gas is not sufficiently diffused in the partition walls, and the catalyst supported in partition walls fails to function sufficiently.

The present invention was made to solve the above problem. An aim of the present invention is to provide a honeycomb structured body capable of achieving more effective use of a catalyst in partition walls and having excellent exhaust gas conversion performance.

Solution to Problem

The present invention provides a honeycomb structured body including: a honeycomb fired body in which multiple through-holes are arranged longitudinally in parallel with one another with a partition wall therebetween, wherein the honeycomb fired body contains ceria-zirconia composite oxide particles and alumina particles, the partition wall of the honeycomb fired body contains macropores having a pore size of 2 to 50 μm, and in an electron microscope image of a cross section of the partition wall, the percentage of the area occupied by pores having a pore size of 5 to 15 μm is at least 85% of the total area of the macropores.

Exhaust gas mainly flows through macropores having a pore size of 2 to 50 μm in the partition walls of the honeycomb structured body and is diffused therein.

Since the percentage of the area occupied by the pores having a pore size of 5 to 15 μm is at least 85% of the total area of the macropores, a decrease in gas diffusion efficiency due to variation in pore size is less likely to occur. In other words, it is possible to prevent the gas from being diffused only in a specific portion of the partition walls.

Thus, when a catalyst is supported on the partition walls, the honeycomb structured body of the present invention can achieve efficient contact between the catalyst and exhaust gas, exhibiting high exhaust gas conversion performance.

Herein, the pore size refers to the diameter (Heywood diameter) of the area equivalent circle of a pore in a cross-sectional view obtained by capturing a cross section of the partition wall with an electron microscope.

The total area of macropores having a pore size of 2 to 50 μm (hereinafter also simply referred to as "macropores") and the area of pores having a pore size of 5 to 15 μm can be determined by the following method.

1) First, a portion of the partition walls of the honeycomb structured body is cut to obtain a measurement sample, and an enlarged image of a cross section of the sample taken along a longitudinal direction is captured by an electron microscope. Here, the electron microscope is set to have an acceleration voltage of 15 kV and a magnification of 500 times.

2) Subsequently, a predetermined region of the obtained electron microscope image is separated into pores and portions without pores using commercially available image analysis software or the like. Then, the diameter (pore size) of the area equivalent circle is determined from the area of each separated pore. Pores having an area equivalent diameter of less than 2 μm are excluded from this measurement.

The process of cutting out a sample from the partition walls of the same honeycomb structured body and capturing an electron microscope image is repeated until more than 1000 pores were measured.

3) Capturing another electron microscope image is ended once the number of pores exceeds 1000. Then, the total area of the macropores having a pore size of 2 to 50 μm and the total area of the pores having a pore size of 5 to 15 μm are calculated from the pore size and the area of each pore measured. Lastly, the percentage of the total area occupied by the pores having a pore size of 5 to 15 μm in the total area of the macropores having a pore size of 2 to 50 μm is determined.

In the honeycomb structured body of the present invention, the honeycomb fired body preferably has a porosity of 55 to 75 vol %.

The honeycomb fired body having a porosity of 55 to 75 vol % can achieve a balance between high mechanical strength and exhaust gas conversion performance.

In the honeycomb structured body of the present invention, the alumina particles are preferably θ-phase alumina particles.

When the alumina particles are θ-phase alumina particles, owing to their high heat resistance, the honeycomb structured body carrying a noble metal can exhibit high exhaust gas conversion performance even after long-term use.

In the honeycomb structured body of the present invention, a noble metal is preferably supported on the honeycomb fired body.

The honeycomb structured body can be used as a honeycomb catalytic converter for exhaust gas conversion with a noble metal supported on the honeycomb fired body.

DESCRIPTION OF EMBODIMENTS

[Honeycomb Structured Body]

First, the honeycomb structured body of the present invention is described.

Figure 1:
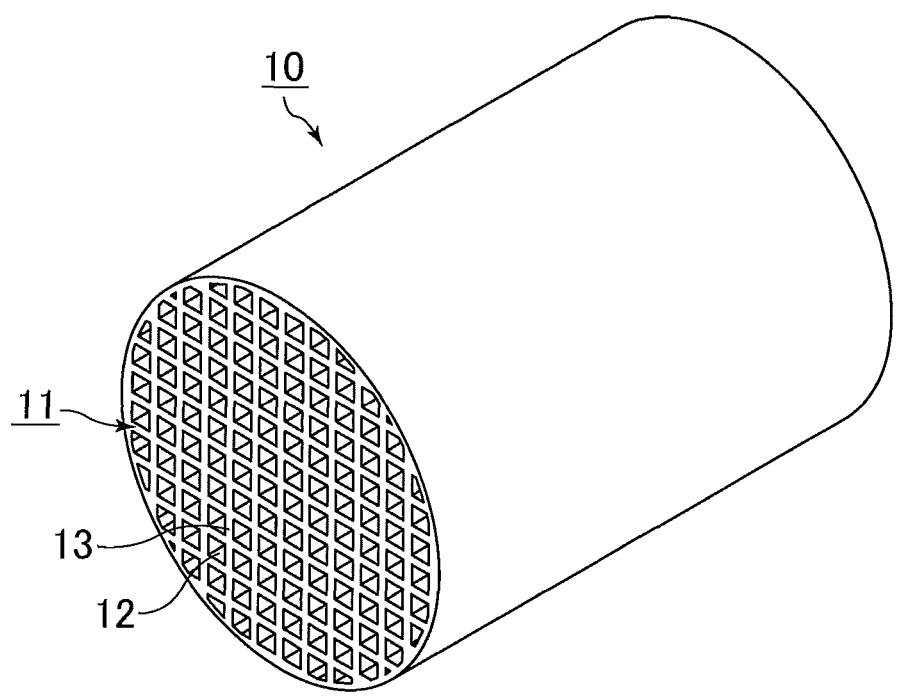
FIG. 1 is a perspective view schematically showing an exemplary honeycomb structured body of the present invention.

FIG. 1 is a perspective view schematically showing an exemplary honeycomb structured body of the present invention.

A honeycomb structured body 10 shown in FIG. 1 includes a single honeycomb fired body 11 in which multiple through-holes 12 are arranged longitudinally in parallel with one another with a partition wall 13 therebetween. The honeycomb fired body 11 contains CZ particles and alumina particles, and is in the form of an extrudate.

When the honeycomb structured body 10 includes a single honeycomb fired body 11 as shown in FIG. 1, the honeycomb structured body 10 is the honeycomb fired body.

In the honeycomb structured body of the present invention, in an electron microscope image of a cross section of the partition wall, the percentage of the area occupied by pores having a pore size of 5 to 15 μm is at least 85% of the total area of the macropores having a pore size of 2 to 50 μm.

Since the percentage of the pores having a pore size of 5 to 15 μm is high in the macropores having a pore size of 2 to 50 μm (hereinafter also simply referred to as "macropores"), a decrease in gas diffusion efficiency due to variation in pore size is less likely to occur.

Thus, when a catalyst is supported on the partition walls, the honeycomb structured body of the present invention can achieve efficient contact between the catalyst and exhaust gas, exhibiting high exhaust gas conversion performance.

The percentage of the area occupied by the pores having a pore size of 5 to 15 μm in the total area of the macropores having a pore size of 2 to 50 μm can be determined by the method using an electron microscope image described above.

In the honeycomb structured body of the present invention, the honeycomb fired body contains CZ particles and alumina particles.

As described later, the honeycomb fired body is produced by extrusion-molding a raw material paste containing CZ particles, alumina particles, and a pore-forming agent, and firing the resulting extrudate.

Whether or not the honeycomb structured body of the present invention contains the CZ particles and the alumina particles can be confirmed by X-ray diffraction (XRD).

The honeycomb structured body of the present invention may include a single honeycomb fired body or multiple honeycomb fired bodies. The multiple honeycomb fired bodies may be combined together with an adhesive layer therebetween.

In the honeycomb structured body of the present invention, a peripheral coat layer may be formed on the outer periphery of the honeycomb fired body.

In the honeycomb structured body of the present invention, the honeycomb fired body preferably has a porosity of 55 to 75 vol %.

The honeycomb fired body having a porosity of 55 to 75 vol % can achieve a balance between high mechanical strength and exhaust gas conversion performance.

When the honeycomb fired body has a porosity of less than 55 vol %, the percentage of pores that can contribute to passing of gas is low in the partition walls, which may increase the pressure loss. When the honeycomb fired body has a porosity of more than 75 vol %, the porosity is so high that the honeycomb structured body has poor mechanical characteristics, and the honeycomb structured body easily cracks, breaks, or the like during use.

The porosity of the honeycomb fired body can be measured by a weighing method described below.

(1) The honeycomb fired body is cut in size of 10 cells×10 cells×10 mm to obtain a measurement sample.

The measurement sample is ultrasonically washed with deionized water and acetone, and dried in an oven at 100° C. The measurement sample having a size of 10 cells×10 cells×10 mm is a sample that is cut out such that the sample includes 10 through-holes aligned longitudinally×10 through-holes aligned transversely, outermost through-holes, and the partition walls constituting the through-holes, with the longitudinal length being 10 mm.

(2) Using a measuring microscope (Measuring Microscope MM-40 available from Nikon, magnification: 100 times), the cross-sectional dimension of the measurement sample is measured, and the volume is determined from a geometric calculation (when the volume cannot be determined from a geometric calculation, the volume is measured by measuring the water-saturated weight and the weight in water).

(3) The weight of the measurement sample based on assumption that the measurement sample is a completely dense body is calculated from the calculated volume and the true density of the measurement sample measured with a pycnometer. A measurement procedure using a pycnometer is as described in (4) below.

(4) The honeycomb fired body is pulverized to prepare 23.6 cc of powder. The powder is dried at 200° C. for 8 hours. Subsequently, the true density is measured according to JIS R 1620:1995, using Auto Pycnometer 1320available from Micromeritics. The evacuation time is 40 minutes.

(5) The actual weight of the measurement sample is measured using an electric balance (HR202i available from A & D).

(6) The porosity of the honeycomb fired body is determined by the following formula.

(Porosity of honeycomb fired body)=100−(actual weight of measurement sample/weight of measurement sample based on assumption that the measurement sample is a completely dense body)×100 [%]

Even when a catalyst is supported on the honeycomb structured body of the present invention, changes in the porosity of honeycomb fired body due to the catalyst are small enough to be ignored.

The alumina particles constituting the honeycomb structured body of the present invention are preferably θ-phase alumina particles.

When the alumina particles are θ-phase alumina particles, owing to their high heat resistance, the honeycomb structured body carrying a noble metal can exhibit high exhaust gas conversion performance even after long-term use.

The honeycomb structured body of the present invention preferably contains γ-alumina used as a binder during production, and preferably further contains alumina fibers.

It is because when boehmite is added as a binder that is required during production of the honeycomb structured body, a large part of boehmite is turned into γ-alumina after firing, and it is because the presence of alumina fibers can improve mechanical characteristics of the honeycomb structured body.

The binder content is preferably 0.1 to 10 wt %, and the alumina fiber content is preferably 10 to 40 wt %.

The shape of the honeycomb structured body of the present invention is not limited to a round pillar shape. Examples of the shape include a prism, a cylindroid shape, a pillar shape having an end face with a racetrack shape, and a prism with rounded corners (e.g., a triangular pillar shape with rounded corners).

In the honeycomb structured body of the present invention, the shape of the through-holes of the honeycomb fired body is not limited to a quadrangular pillar shape. For example, it may be a triangular pillar shape or a hexagonal pillar shape.

In the honeycomb structured body of the present invention, the density of the through-holes in a cross section perpendicular to the longitudinal direction of the honeycomb fired body is preferably 31 to 155 pcs/cm$^2$.

In the honeycomb structured body of the present invention, the thickness of the partition wall of the honeycomb fired body is preferably 0.05 to 0.50 mm, more preferably 0.10 to 0.30 mm.

In the honeycomb structured body of the present invention, when a peripheral coat layer is formed on the outer periphery of the honeycomb fired body, the thickness of the peripheral coat layer is preferably 0.1 to 2.0 mm.

The honeycomb structured body of the present invention may include a single honeycomb fired body or multiple honeycomb fired bodies. The multiple honeycomb fired bodies may be combined together with an adhesive layer therebetween.

In the honeycomb structured body of the present invention, a noble metal is preferably supported on the honeycomb fired body.

The honeycomb structured body in which a noble metal that functions as a catalyst is supported on the honeycomb fired body can be used as a honeycomb catalytic converter for exhaust gas conversion.

Examples of the noble metal include platinum, palladium, and rhodium.

In the honeycomb structured body of the present invention, the amount of the noble metal supported is preferably 0.1 to 15 g/L, more preferably 0.5 to 10 g/L.

The term "amount of the noble metal supported" as used herein refers to the weight of the noble metal per apparent volume of the honeycomb structured body. The apparent volume of the honeycomb structured body includes the pore volumes. It includes the volume of the peripheral coat layer and/or the volume of an adhesive layer.

[Method of Producing Honeycomb Structured Body]

Next, the method of producing a honeycomb structured body of the present invention is described.

The honeycomb structured body of the present invention can be obtained by the following steps, for example: a molding step of molding a raw material paste containing a pore-forming agent having a D50 of 10 to 30 μm and a particle size distribution index represented by (D90-D10)/D50 of 1.5 or less, CZ particles, and alumina particles into a honeycomb molded body in which multiple through-holes are arranged longitudinally in parallel with one another with a partition wall therebetween; a drying step of drying the honeycomb molded body; and a step of firing the honeycomb molded body dried in the drying step.

(Molding Step)

In the molding step, a raw material paste containing CZ particles, alumina particles, and a pore-forming agent is molded into a honeycomb molded body in which multiple through-holes are arranged longitudinally in parallel with one another with a partition wall therebetween.

In the molding step, first, a raw material paste containing CZ particles, alumina particles, and a pore-forming agent is prepared.

The pore-forming agent for use in preparation of the raw material paste has a D50 of 10 to 30 μm and a particle size distribution index represented by (D90-D10)/D50 of 1.5 or less. The D50 of the pore-forming agent is preferably 15 to 30 μm, and the particle size distribution index thereof is preferably 1 or less.

Use of the pore-forming agent having a D50 of 10 to 30 μm and a particle size distribution index of 1.5 or less in preparation of the raw material paste can produce many pores having a pore size of 5 to 15 μm and thus provide the honeycomb structured body of the present invention in which the percentage of the area occupied by pores having a pore size of 5 to 15 μm is at least 85% of the total area of the macropores having a pore size of 2 to 50 μm.

Preferably, the D50 of the pore-forming agent is 15 to 30 μm, and the particle size distribution index thereof is 1 or less. When the D50 and the particle size distribution index are in the above ranges, it is possible to produce more pores having a pore size of 5 to 15 μm.

Use of alumina particles having a D50 of 1 to 30 μm is preferred.

In addition, use of CZ particles having a D50 of 1 to 10 μm is preferred.

Further, the D50 of the alumina particles to be used is preferably larger than the D50 of the CZ particles.

The weight ratio of the ceria-zirconia composite oxide particles to the alumina particles (ceria-zirconia composite oxide particles/alumina particles) for use in preparation of the raw material paste is preferably 1.0 to 3.0.

When the weight ratio (ceria-zirconia composite oxide particles/alumina particles) is 1.0 to 3.0, the ceria-zirconia composite oxide particle content is high, which improves the exhaust gas conversion performance because the ceria-zirconia composite oxide particles are used as co-catalysts.

The D50 of the alumina particles and the CZ particles and the D10, D50, and D90 of the pore-forming agent can be measured using a laser diffraction particle size distribution meter (Mastersizer 2000 available from Malvern Panalytical).

Here, the D10 refers to the particle size at which a cumulative volume of 10 vol % of the particles are smaller on the volume-based cumulative particle size distribution curve. The D50 refers to the particle size at which a cumulative volume of 50 vol % of the particles are smaller on the volume-based cumulative particle size distribution curve. The D90 refers to the particle size at which a cumulative volume of 90 vol % of the particles are smaller on the volume-based cumulative particle size distribution curve. The D50 is also referred to as the "average particle size".

The alumina particles for use in preparation of the raw material paste are preferably θ-phase alumina particles.

The pore-forming agent is not limited as long as the D50 is 10 to 30 μm and the particle size distribution index represented by (D90-D10)/D50 is 1.5 or less. Examples of the pore-forming agent that satisfies these conditions include acrylic resins, starch, and carbon.

The pore-forming agent may be one whose particles have been classified to satisfy the D50 and the particle size distribution index.

Classification may be performed by a method that uses a classifier, a method that uses a sieve, or the like.

In the case of the method that uses a sieve, it is preferred to select and use a pore-forming agent whose particles pass through a 500-mesh sieve but not a 1000-mesh sieve. Classification of particles of the pore-forming agent using sieves as described above facilitates adjusting the D50 and the particle size distribution index in the ranges of 10 to 30 μm and 1.5 or less, respectively. In addition, removal of particles having a relatively small particle size facilitates adjusting the D50 and the particle size distribution index in the ranges of 15 to 30 μm and 1 or less, respectively.

Examples of the classifier include a centrifugal classifier.

Examples of other raw materials for use in preparation of the raw material paste include inorganic fibers, binders such as inorganic binders, and organic binders, forming auxiliaries, and dispersion media.

Any material may be used to constitute the inorganic fibers. Examples include alumina, silica, silicon carbide, silica alumina, glass, potassium titanate, and aluminum borate. Two or more of these may be used in combination. Of these, alumina fibers are preferred.

The inorganic fibers preferably have an aspect ratio of preferably 5 to 300, more preferably 10 to 200, still more preferably 10 to 100.

Any inorganic binder may be used. Examples include solids contained in materials such as alumina sol, silica sol, titania sol, sodium silicate, sepiolite, attapulgite, and boehmite. Two or more of these may be used in combination. Of these, boehmite is preferred.

Boehmite is alumina monohydrate with a composition of AlOOH, and has good dispersibility in media such as water. Thus, in the method for producing a honeycomb structured body of the present invention, boehmite is preferably used as the binder.

Any organic binder may be used. Examples include methyl cellulose, carboxymethyl cellulose, hydroxyethyl cellulose, polyethylene glycol, phenolic resin, and epoxy resin. Two or more of these may be used in combination.

Any dispersion medium may be used. Examples include water, organic solvents such as benzene, and alcohols such as methanol. Two or more of these may be used in combination.

Any forming auxiliary may be used. Examples include ethylene glycol, dextrins, fatty acids, fatty acid soaps, and polyalcohols. Two or more of these may be used in combination.

When the CZ particles, alumina particles, alumina fibers, and boehmite are used as the materials of the raw material paste, the percentage of each of these materials relative to the total solids remaining in the raw material paste after the firing step is preferably as follows: CZ particles: 40 to 60 wt %; alumina particles: 15 to 35 wt %; alumina fibers: 10 to 40 wt %, and boehmite: 0.1 to 10 wt %.

The percentage of the dry volume of the pore-forming agent in the dry volume of the raw material paste is preferably 45 to 70 vol %.

The weight ratio of the CZ particles to the alumina particles (CZ particles/alumina particles) for use in preparation of the raw material paste is preferably 1.0 to 3.0.

When the weight ratio (CZ particles/alumina particles) is 1.0 to 3.0, the CZ particle content is high, which can enhance the action of a catalyst supported and improve the exhaust gas conversion performance of the honeycomb catalytic converter because the CZ particles are used as co-catalysts.

Preparation of the raw material paste preferably involves mixing/kneading of the above raw materials. A device such as a mixer or an attritor may be used for mixing, or a device such as a kneader may be used for kneading.

In the method of producing a honeycomb structured body of the present invention, the raw material paste prepared by the above method is extrusion-molded into a honeycomb molded body.

Specifically, the raw material paste is passed through a die of a specific shape to form a continuous honeycomb molded body having through-holes of a specific shape, and the continuous honeycomb molded body is cut to a specific length, whereby a honeycomb molded body is obtained.

(Drying Step)

The method of producing a honeycomb structured body of the present invention includes drying the molded body obtained in the molding step.

Here, preferably, a dryer such as a microwave dryer, a hot-air dryer, a dielectric dryer, a reduced-pressure dryer, a vacuum dryer, or a freeze-dryer is used to dry the honeycomb molded body into a honeycomb dried body.

Herein, the honeycomb molded body and the honeycomb dried body before the firing step are also collectively referred to as a "honeycomb molded body".

(Firing Step)

In the firing step, the molded body dried in the drying step is fired into a honeycomb fired body. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not limited, but an atmosphere with an oxygen concentration of 1 to 20% is preferred.

The honeycomb structured body of the present invention can be produced by the above steps.

(Other Steps)

The method of producing a honeycomb structured body of the present invention may further include a supporting step of allowing a noble metal to be supported on the honeycomb fired body, if necessary.

Examples of the method for allowing a noble metal to be supported on the honeycomb fired body include a method in which the honeycomb fired body or the honeycomb structured body is immersed in a solution containing noble metal particles or a noble metal complex, and the honeycomb fired body or the honeycomb structured body is then removed and heated.

When the honeycomb structured body includes a peripheral coat layer, a noble metal may be supported on the honeycomb fired body before the peripheral coat layer is formed, or a noble metal may be supported on the honeycomb fired body or the honeycomb structured body after the peripheral coat layer is formed.

In the method of producing a honeycomb structured body of the present invention, the amount of the noble metal supported in the supporting step is preferably 0.1 to 15 g/L, more preferably 0.5 to 10 g/L.

When the method of producing a honeycomb structured body of the present invention includes forming a peripheral coat layer on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. A paste having the same composition as the raw material paste can be used as the peripheral coat layer paste.

EXAMPLES

Examples that more specifically disclose the present invention are described below. The present invention is not limited to these examples.
[Preparation of Evaluation Sample]

Example 1

The following materials were mixed/kneaded into a raw material paste: CZ particles (D50: 2 μm) (16.9 wt %); γ-alumina particles (D50: 20 μm) (8.5 wt %); boehmite as an inorganic binder (2.8 wt %); alumina fibers having an average fiber diameter of 3 μm and an average fiber length of 100 μm (10.6 wt %); methylcellulose as an organic binder (3.9 wt %); classified starch as a pore-forming agent which is capable of passing through a 500-mesh and incapable of passing through a 1000-mesh (aspect ratio: 1.0; D50: 14.2 μm; particle size distribution index: 1.1) (28.1 wt %); polyoxyethylene oleyl ether (surfactant) as a forming auxiliary (2.9 wt %); and deionized water (26.2 wt %). The forming auxiliary has a viscosity at 30 ° C. of 50 mPa·s. The percentage of the dry volume of the pore-forming agent in the dry volume of the raw material paste was 55.0 vol %.

The D50 of the alumina particles and the CZ particles and the D10, D50, and D90 of the pore-forming agent were measured using a laser diffraction particle size distribution meter (Mastersizer 2000 available from Malvern Panalytical).

Using an extruder, the raw material paste was extrusion-molded into a round pillar-shaped honeycomb molded body. Then, using a reduced-pressure microwave dryer, the honeycomb molded body was dried at an output of 1.74 kW under a reduced pressure of 6.7 kPa for 12 minutes, and then degreased/fired at 1100° C. for 10 hours, whereby a honeycomb fired body was produced. The honeycomb fired body had a round pillar shape with a diameter of 103 mm and a length of 80 mm in which the density of the through-holes was 77.5 pcs/cm$^2$ (500 cpsi) and the thickness of the partition wall was 0.127 mm (5 mil).

Comparative Example 1

A honeycomb structured body according to Comparative Example 1 was produced by the same procedure as in Example 1, except that the pore-forming agent was used without classifying its particles. The aspect ratio, D50, and particle size distribution index of the pore-forming agent used in Comparative Example 1 without classifying its particles were 1.0, 16.6 μm, and 2.1, respectively.
[Measurement of Pores]

A portion of the partition walls of each of the honeycomb structured bodies according to Example 1 and Comparative Example 1 was cut to obtain a measurement sample, and an enlarged image of a cross section of the sample taken along a longitudinal direction was captured by an electron microscope. The electron microscope was "VE-9800" available from Keyence Corporation. The acceleration voltage was 15 kV, and the magnification was 500 times.

Figure 2:
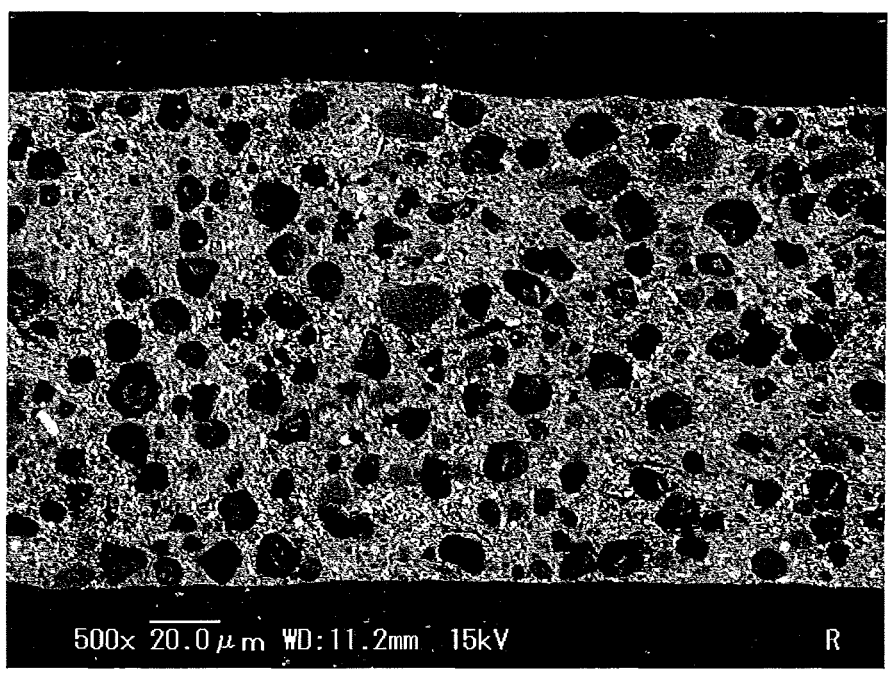
FIG. 2 is an electron microscope image of a cross section of a honeycomb structured body according to Example 1.
Figure 3:
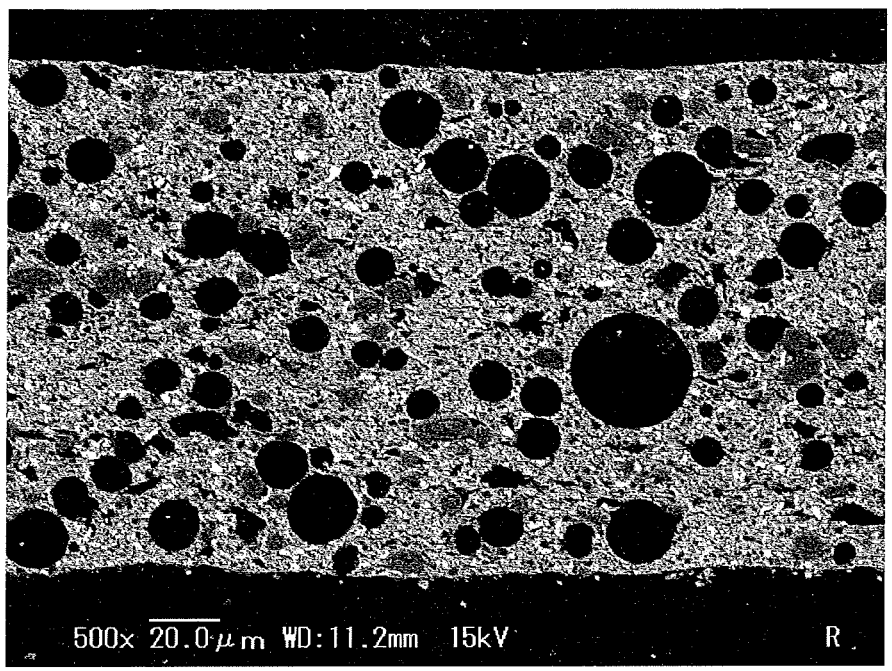
FIG. 3 is an electron microscope image of a cross section of a honeycomb structured body according to Comparative Example 1.

The electron microscope image was separated into pores and portions without pores using the accompanying image analysis software, and the diameter of the area equivalent circle (area equivalent diameter) was determined from the area of each separated pore. Pores having an area equivalent diameter of less than 2 μm were excluded. The process of cutting out a sample from the same honeycomb structured body and capturing an electron microscope image was repeated until more than 1000 pores were measured. Then, the total area of the macropores having a pore size of 2 to 50 μm and the total area of the pores having a pore size of 5 to 15 μm were calculated from the pore diameter and the area of each pore measured. Lastly, the percentage of the area occupied by the pores having a pore size of 5 to 15 μm in the total area of the macropores having a pore size of 2 to 50 μm was determined. Table 1 shows the results. FIG. 2 and FIG. 3 each show an electron microscope image captured. FIG. 2 is an electron microscope image of a cross section of the honeycomb structured body according to Example 1. FIG. 3 is an electron microscope image of a cross section of the honeycomb structured body according to Comparative Example 1.
[Evaluation of Exhaust Gas Conversion Performance]

The exhaust gas conversion performance was measured by the following method. Table 1 shows the results.

Each of the honeycomb fired bodies of Example 1 and Comparative Example 1 was set in a V6-3.5 L engine, and the temperature (HC light-off temperature) at which the HC concentration ((HC inflow−HC outflow)/(HC inflow)×100) reached 50% since the start of stoichiometric engine operation was measured to evaluate the exhaust gas conversion performance of each honeycomb structured body.

When the temperature at which the HC concentration reached 50% is lower, it means that the exhaust gas conversion performance is better. When the temperature is lower than 280° C., the exhaust gas conversion performance is determined to be sufficient. Table 1 shows the results.

TABLE 1

|  | Example 1 | Comparative Example 1 |
|---|---|---|
| Pore-forming agent |  |  |
| Percentage of dry volume [vol %] | 55.0 | 55.0 |
| D50 [μm] | 14.2 | 16.6 |
| Particle size distribution index | 1.1 | 2.1 |
| Honeycomb structured body |  |  |
| Porosity [%] | 64 | 64 |
| Total area A of macropores having a pore size of 2 to 50 μm [μm$^2$] | 87942 | 69777 |
| Total area B of pores having a pore size of 5 to 15 μm [μm$^2$] | 74478 | 44654 |
| B/A [%] | 88 | 64 |
| HC light-off temperature [° C.] | 270 | 300 |

The results in Table 1 show that in the honeycomb structured body of the present invention, the percentage of the pores having a pore size of 5 to 15 μm in the macropores is high, and a decrease in gas diffusion efficiency is less likely to occur.

FIG. 2 and FIG. 3 show that the honeycomb structured body according to Example 1 in which variation in pore size is smaller exhibit better exhaust gas conversion performance than the honeycomb structured body according to Comparative Example 1 in which variation in pore side is larger.

REFERENCE SIGNS LIST 10 honeycomb structured body
11 honeycomb fired body
12 through-hole
13 partition wall

The invention claimed is:

1. A honeycomb structured body comprising:
a honeycomb fired body in which multiple through-holes are arranged longitudinally in parallel with one another with a partition wall therebetween,
wherein the honeycomb fired body contains ceria-zirconia composite oxide particles and alumina particles,
the partition wall of the honeycomb fired body contains macropores having a pore size of 2 to 50 μm, and
in an electron microscope image of a cross section of the partition wall, the percentage of the area occupied by pores having a pore size of 5 to 15 μm is at least 85% of the total area of the macropores.

2. The honeycomb structured body according to claim 1, wherein the honeycomb fired body has a porosity of 55 to 75 vol %.

3. The honeycomb structured body according to claim 2, wherein the alumina particles are θ-phase alumina particles.

4. The honeycomb structured body according to claim 2, wherein a noble metal is supported on the honeycomb fired body.

5. The honeycomb structured body according to claim 1, wherein the alumina particles are θ-phase alumina particles.

6. The honeycomb structured body according to claim 5, wherein a noble metal is supported on the honeycomb fired body.

7. The honeycomb structured body according to claim 1, wherein a noble metal is supported on the honeycomb fired body.

* * * * *